(12) United States Patent
Hensley et al.

(10) Patent No.: US 6,724,608 B2
(45) Date of Patent: Apr. 20, 2004

(54) METHOD FOR PLASMA CHARGING A PROBE

(76) Inventors: Paul Hensley, 5 Kendles Run Rd., Moorestown, NJ (US) 08057; Charles Carney, 2127 West Ave., Lynwood, NJ (US) 08220

(*) Notice: Subject to any disclaimer, the term of this patent is extended or adjusted under 35 U.S.C. 154(b) by 33 days.

(21) Appl. No.: 10/094,403

(22) Filed: Mar. 8, 2002

(65) Prior Publication Data

US 2003/0047441 A1 Mar. 13, 2003

Related U.S. Application Data

(63) Continuation-in-part of application No. 09/765,733, filed on Jan. 12, 2001, now abandoned, and a continuation-in-part of application No. PCT/US01/01262, filed on Jan. 12, 2001.
(60) Provisional application No. 60/176,201, filed on Jan. 14, 2000.

(51) Int. Cl.$^7$ ............................................... H01H 47/32
(52) U.S. Cl. ....................................................... 361/229
(58) Field of Search .................................. 361/229, 225

(56) References Cited

U.S. PATENT DOCUMENTS

| | | | | |
|---|---|---|---|---|
| 5,377,070 A | * | 12/1994 | Kawamoto | 361/229 |
| 5,633,424 A | * | 5/1997 | Graves et al. | 588/227 |
| 5,700,327 A | * | 12/1997 | Babacz et al. | 134/1.1 |
| 5,706,162 A | * | 1/1998 | Bergen et al. | 361/230 |
| 5,872,426 A | * | 2/1999 | Kunhardt et al. | 313/582 |
| 5,977,715 A | * | 11/1999 | Li et al. | 315/111.51 |
| 6,005,349 A | * | 12/1999 | Kunhardt et al. | 315/111.21 |
| 6,059,935 A | * | 5/2000 | Spence | 204/156 |
| 6,105,589 A | * | 8/2000 | Vane | 134/1.1 |
| 6,132,813 A | * | 10/2000 | Chen et al. | 427/490 |
| 6,262,523 B1 | * | 7/2001 | Selwyn et al. | 313/231.31 |

* cited by examiner

Primary Examiner—Hung V. Ngo
(74) Attorney, Agent, or Firm—Scott J. Fields, Esq.; National IP Rights Center, LLC

(57) ABSTRACT

A method for electrically charging a probe by plasma technology for use in pipetting compounds in small volumes includes the steps of placing the probe to be charged in a plasma chamber; creating a vacuum within the plasma chamber and then introducing a stable gas into the plasma chamber; applying electromagnetic energy to the plasma chamber, thereby molecularly disassociating the gas, thus creating charged ions, free electrons, and free radicals, charging the probe by the free radicals attaching to the probe; venting the plasma chamber to back to atmospheric pressure; and removing the charged probe from the plasma chamber, whereby the charged probe can pipette compounds in small volumes. The method is applicable to pipetting both liquid and solid compounds. In another embodiment, the plasma generation is at atmospheric pressure without a containment chamber and the surface charging effect is used for surfaces of both the fluid dispensing device and the fluid containing device. The component surfaces of the fluid dispensing or fluid containing device are placed in proximity to the plasma generation device within the area of plasma generation, electromagnetic energy is applied to the existing atmospheric gas or to the existing atmospheric gas with other gases added, thereby molecularly disassociating the gas, thus creating charged ions, free electrons, and free radicals, charging the surfaces of the fluid dispensing or fluid containing device and then removing the fluid dispensing or fluid containing device from the area of plasma generation.

9 Claims, 1 Drawing Sheet

METHOD FOR PLASMA CHARGING A PROBE

CLAIM OF PRIORITY

This application derives priority from co-pending U.S. Ser. No. 60/176,201 filed Jan. 14, 2000, and is a continuation-in-part of U.S. Ser. No. 09/765,733 filed Jan. 12, 2001 and PCT/US01/01262 filed Jan. 12, 2001.

FIELD OF THE INVENTION

The present invention relates to a method for use of plasma to apply a controlled charge to a surface.

BACKGROUND OF THE INVENTION

Within the disciplines of the clinical, industrial and life science laboratory, scientists perform methods and protocols with extremely small quantities of fluids. These fluids consist of many categories and types with various physical properties. Many times volumes are worked with that are between a drop (about 25 microliters) and a few nanoliters. There are a number of standard methods employed to transfer liquid compounds from a source by aspirating the liquid from such fluid holding device into the fluid dispensing device having a probe, cannula, pin tool or other similar component or plurality of components which move, manually or robotically, and then dispensing, from the same probe or plurality of probes, into another fluid holding device.

Four common techniques are (1) a scheme using a probe or cannula, that may or may not be coated with a layer of material or special coating, which is attached directly or by a tube to a pumping device, (2) a scheme using a disposable pipet instead of the probe/cannula but otherwise similar, (3) a scheme using a spray head with one or a plurality of openings and pumping system that physically propels multiple precisely metered microdroplets, and (4) a scheme using metal shafts with precisely machined hollowed out spaces at their ends that hold the fluid by surface tension (commonly referred to as a "pin tool").

As routine a process as fluid transfer is in the laboratory, technical challenges to achieve suitable levels of precision and accuracy remain. As the volume decreases, it becomes progressively more technically challenging to aspirate and dispense these very small quantities of fluids due to the various effects of interaction between the dispensing device and the fluid. Droplet formation, as the fluid is dispensed, is a change in the shape of the fluid. The droplet experiences changes in internal forces during the process (e.g., surface tension, viscosity, and polarity) and in external forces due to interactions between the fluid and the surfaces of the probe, cannula, pin tool or other similar component (e.g., superficial and interfacial energies). It is desirable to control and be able to use these forces to improve the process. The use of low temperature atmospheric plasma in such a way so as to place a charge on the probe, cannula, pin tool or other similar component, in order to control properties of the surface of the probe, cannula, pin tool or other similar component in order to attract or repel the fluid accomplishes this desired objective. This control is achieved by metering the deposition of charge by the plasma. The optimum conditions for fluid transfer can be reached taking into consideration the application, fluid characteristics, the affect of any compound dissolved in the liquid, the affect of any particles or other physical matter in the liquid and the type of probe or delivery mechanism used.

The charge from the plasma on the surfaces of the probe, cannula, pin tool or other similar component will alter forces effecting droplet formation, the force required to release the droplet from the probe, cannula, pin tool or other similar component, the surface tension interaction between the liquid and the probe, cannula, pin tool or other similar component, and help suppress the formation of microdroplets (parts of the fluid being transferred that can break off) during dispensing. Some fluid dispensing devices allow the plasma to be pulled into the internal spaces of the probe, cannula or other similar component. The plasma generated surface effects on the fluid inside will have similar action as on the outside surfaces. Exposing the internal surfaces of the probe, cannula or other similar component adds additional control to the total affect of the plasma charge on the fluid handling process.

The same surface effect of the plasma charge on the surfaces of the dispensing device can be applied to the surfaces of the fluid containing device into or onto which the fluid is dispensed. The controlled charge can improve the flow of the small fluid droplets down the side wall of a tube or microplate well and will affect the shape of the fluid droplet formation at the bottom of a tube, microplate well or fluid processing surface. As volumes being transferred decrease, the affect of the plasma charge on the surface becomes more important. On fluid processing surfaces (surfaces onto which droplets are transferred but without a side wall defining a tube or well), the shape of the droplets on the surface determines the diameter and depth of the fluid at a defined droplet volume. The charge on the surface of the plate can alter and thereby control the forces of interaction between the droplet and the plate and, as a result, control these parameters.

Plasma technology is known in the art and is presently used in connection with a wide variety of applications. The most common uses of plasma are based on technologies that rely on the generation of plasma in a low pressure environment.

To sterilize medical devices, a technique known as glow discharge is often used, in which the items are sterilized in air, as opposed to a gas-filled evacuated chamber. For example, U.S. Pat. No. 5,633,424 relates to a method of sterilizing items using water vapor-based plasma. The items to be sterilized are placed in a chamber, which is then evacuated. Water vapor is introduced into the chamber and is allowed to uniformly disperse throughout the chamber. Electromagnetic radiation energy is then applied to the chamber, fractionating the water molecules into reactive radicals. These radicals then combine with the microorganisms on the items, effectively vaporizing the microorganisms. The by-product gases are exhausted from the chamber, and the now-sterilized items can be removed from the chamber.

U.S. Pat. No. 5,700,327 recites a method for removing organic compounds from hollow containers, thereby cleaning the containers. The container is placed into a vacuum chamber, and an oxidizing gas is introduced into the chamber. An electric field is then applied to the chamber, converting the oxidizing gas into low temperature plasma, which then oxidizes substantially all of the organic compounds within the container.

U.S. Pat. No. 6,059,935 discloses two methods and corresponding electrode designs for the generation of a plasma, for example, at or about one atmosphere. Using the disclosed methods, various webs, films and three-dimensional objects are beneficially treated in a reduced amount of time. A first method utilizes a repetitive, asymmetric voltage pulse to generate a plasma discharge between two electrodes. An asymmetric voltage pulse is used to generate a discharge in which a substrate can be exposed predominately to either positive or negative plasma species depending on the voltage polarity used. A second method uses the gap capacitance of an electrode pair and an external inductor in shunt to form a resonant IC circuit. The circuit is driven by a high power radio frequency source operating at 1 to 30 MHz to generate a uniform discharge between the electrode pair. Both methods have temperature controlled discharge surfaces with supply gas temperature, humidity and flow rate control. The gas flow is typically sufficient to cause a turbulent flow field in the discharge region where materials are treated. Electrode pairs implement these methods and include a metal faced electrode and a dielectric covered electrode, one or both of which have a series of holes extending through the electrode face for supply gas flow. The second of the above-described methods will also operate with paired, metal faced electrodes, but under more restricted operating conditions.

U.S. Pat. No. 6,132,813 discloses a method for modifying a substrate surface, including the step of applying a high density plasma to the substrate surface in the presence of a hydrofluorocarbon gas and a carrier gas to form an antiwetting layer on the substrate surface. Optionally, the method includes a cleaning step of contacting the slider surface with a carrier gas for a period of time effective to clean the surface.

U.S. Pat. No. 6,105,589 is directed to an improved method and apparatus are provided for cleaning the specimen and interior specimen chamber of electron microscopes, and similar electron beam instruments. The apparatus consists of a glow-discharge, oxygen-radical generator placed on a specimen chamber port with an excitation source to create a low-power glow-discharge plasma inside the generator. Air or other oxygen and nitrogen mixture is admitted to the generator at a pressure between 0.3 Torr and 5 Torr. The low power glow discharge is used to disassociate oxygen preferentially over nitrogen to create the oxygen radicals. The oxygen radicals then disperse by convection throughout the chamber to clean hydrocarbons from the surfaces of the chamber, stage and specimen by oxidation to CO and H2O gases.

A number of patents have been issued for plasma generation at atmospheric pressure. Current research with these basic methods has allowed the development of a number of plasma techniques formerly only done at low pressure to be performed at atmospheric pressure. Atmospheric plasma generation has its own set of technical advantages and disadvantages.

U.S. Pat. No. 5,977,715 discloses an atmospheric pressure glow discharge plasma source without the use of an arc. The plasma chamber is capable of producing stable plasma in Ar, He and $O_2$ mixtures using a low voltage RF power supply.

U.S. Pat. Nos. 5,872,426 and 6,005,349 (a division of application Ser. No. 08/820,013, filed Mar. 18, 1997, now U.S. Pat. No. 5,872,426) and 6,147,452 (a continuation-in-part application Ser. No. 08/820,013, filed Mar. 18, 1997, now U.S. Pat. No. 5,872,426) disclose a number of methods and apparatus for stabilizing glow plasma discharges by suppressing the transition from glow-to-arc by including a perforated dielectric plate with characteristics detailed in the patent. The patents detail embodiments with a wide range of electric fields including DC and RF fields of varying strength and an AC glow discharge device in which the frequency of the AC source is adjusted to be matched to the characteristics of the apertured dielectric. In this embodiment jets come out of the apertures at the proper frequency.

In U.S. Pat. No. 6,262,523 the patent discloses the device to generate a large area atmospheric-pressure plasma jet that can be operated near room temperature. The jet can extend up to 8 inches beyond the open end of the electrodes.

DETAILED DESCRIPTION OF THE INVENTION

Figure 1:
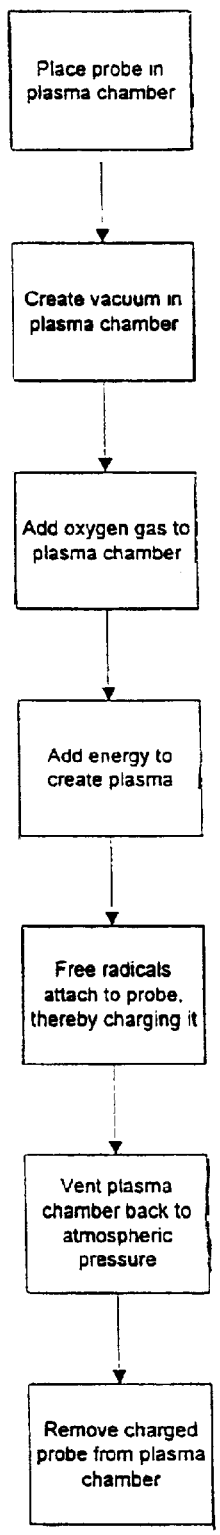
FIG. 1 is a diagram of the present invention.

FIG. 1 outlines the steps of the method of the present invention. First, a probe or other type of fluid handling device, preferably coated with a material optimized to the fluid characteristics of the application, such as TEFLON-coated but applying to probes with any coating, is placed into either a plasma chamber and the chamber is sealed or is placed in proximity to a low temperature, atmospheric plasma source within the area that plasma will be generated.

In the instance of using a plasma chamber, a vacuum is crated in the sealed plasma chamber, and oxygen gas, along with an argon carrier gas, is introduced into the chamber and dissipates throughout the chamber. Sufficient electromagnetic energy is added to the chamber to ionize the oxygen gas within the carrier gas mixture, creating mainly 0 ions, free electrons, and free radicals. Because the probe has very little organic material on the surfaces when it is placed in the plasma chamber, what organic material that is present is quickly removed and the ions and free radicals have no other substance to attach to, and cling to the probe, thereby imparting a charge to the probe. The vacuum chamber is then vented, returning it to atmospheric pressure, and the now-charged probe is removed from the chamber.

In the instance of using a low temperature, atmospheric plasma, the method is similar except no vacuum or chamber is required and venting is unnecessary. In either instance, the probe is charged by the plasma in a controlled and precise manner.

This method is performed by a machine that does not require human contact with the probe, which could dissipate the charge and possibly "contaminate" the probe. Under these conditions, the method is performed similar to a "tip wash" as is commonly performed. This method can be used as a replacement for a "tip wash", as any organic material on the probe will be ionized, oxidized and/or vaporized by the plasma as the probe is charged by the plasma.

After the probe has been plasma-charged according to the method, it can be used to pipette liquid compounds. The compounds being pipetted with the probe can be quite variable in consistency and physical properties. The major variables affecting the consistency of a liquid compound transfer are surface charge characteristics (hydrophilic to hydrophobic), viscosity, polarity (the electric charge of the solvent and solute), pH, ionic strength, and vapor pressure.

By using the plasma-charging method, the surface characteristics of a probe can be modified to optimize pipetting characteristics of different types of compounds used and otherwise reduce the interaction of the fluid and surface material. The surface characteristics can be "tuned" to the optimum requirements for a compound. By modifying the surface characteristics this manner, the pipetting system can work more optimally over a broader range of compounds and solvents, such as those used in drug discovery and other life science applications. This control is critical when working with small volumes. At low volumes, most noticeably at single digit microliter quantities or less, compound characteristics will cause a liquid to cling to the surface it is attached to and remain attached to the column of fluid from which it is being metered, thus making the accurate and reproducible metering of these small volumes difficult. Applying a charge to the probe can overcome a liquid's tendency to cling to other surfaces and reduce a number of other phenomena that degrade the precision and accuracy of the fluid handling process.

It will be understood that the embodiment described herein is merely exemplary and that a person skilled in the art may make many variations and modifications without departing from the spirit and scope of the present invention. For example, the method can also be applied to charging a probe for use in connection with solid (i.e., dry) compounds. All such variations and modifications are intended to be included within the scope of the invention as defined in the appended claims.

What is claimed is:

1. A method for electrically charging a probe, cannula, pin tool or other similar component or plurality of such components made of any material of a fluid dispensing device used to pipet small volumes of fluids by plasma technology comprising the following steps:

placing such probe, cannula, pin tool or other similar component or plurality of such components to be charged in a space that plasma is generated by a plasma generating device;

applying electromagnetic energy to the plasma generating device, thereby molecularly disassociating the gas, thus creating charged ions, free electrons, and free radicals, and charging the surface by the charged ions and free radicals attaching to the probe, cannula, pin tool or other similar component or plurality of such components;

removing the charged probe, cannula, pin tool or other similar component or plurality of such components from the area of plasma generation, whereby the charged probe, cannula, pin tool or other similar component or plurality of such components can pipette compounds in small volumes.

2. A method for electrically charging a probe, cannula, pin tool or other similar component or plurality of such components made of any material of a fluid dispensing device used to pipet small volumes of fluids by plasma technology comprising the following steps:

placing such probe, cannula, pin tool or other similar component or plurality of such components to be charged within in a space that plasma is generated by a plasma generating device;

using the plasma generating device to introduce a gas mixture of oxygen and a carrier gas into the plasma; and applying electromagnetic energy to the gas mixture, thereby causing a breakdown of the Oxygen ($O_2$) molecules into O Ions, free electrons, and free radicals; (i.e., the plasma), thereby causing the ions and free radicals to attack and attach to the probe, cannula, pin tool or other similar component or plurality of such components, thereby imparting a charge to the surface.

removing the charged probe, cannula, pin tool or other similar component or plurality of such components from the area of plasma generation, whereby the charged probe, cannula, pin tool or other similar component or plurality of such components can pipette compounds in small volumes.

3. The method of claim 2 wherein the carrier gas is argon.

4. A method for electrically charging a probe, cannula, pin tool or other similar component or plurality of such components made of any material of a fluid dispensing device and coated with one or more additional materials or treatments used to pipet small volumes of fluids by plasma technology comprising the following steps:

placing such coated probe, cannula, pin tool or other similar component or plurality of such components with a physical coating or permanent surface treatment to be charged in a space that plasma is generated by a plasma generating device;

applying electromagnetic energy to the plasma generating device, thereby molecularly disassociating the gas, thus creating charged ions, free electrons, and free radicals, and charging the surface by the charged ions and free radicals attaching to the probe, cannula, pin tool or other similar component or plurality of such components;

removing the charged probe, cannula, pin tool or other similar component or plurality of such components from the area of plasma generation, whereby the charged probe, cannula, pin tool or other similar component or plurality of such components can pipette compounds in small volumes.

5. The methods of claims 1 for electrically charging a probe, cannula, pin tool or other similar component or plurality of such components made of any material of a fluid dispensing device used to pipet small volumes of fluids by plasma technology comprising the following steps:

placing such probe, cannula, pin tool or other similar component or plurality of such components to be charged in a space that plasma is generated by a plasma generating device;

applying electromagnetic energy to the plasma generating device, thereby molecularly disassociating the gas, thus creating charged ions, free electrons, and free radicals, and charging the probe by the charged ions and free radicals attaching to the probe, cannula, pin tool or other similar component or plurality of such components;

using the fluid dispensing device to create a backpressure or vacuum within the probe, cannula or other similar component or plurality of such components and pulling the plasma into the interior space of the probe, cannula or other similar component or plurality of such components;

using the fluid handling device to create a positive pressure within the probe, cannula or other similar component or plurality of such components to expel the plasma from the interior space of the probe, cannula or other similar component or plurality of such components;

repeating the prior two steps, as desired;

removing the charged component from the area of plasma generation, whereby the charged probe, cannula or other similar component or plurality of such components can pipette compounds in small volumes.

6. A method for electrically charging the surfaces of a fluid containing device, such as, but not limited to, a tube or microplate made of any material, with one or a plurality of containment wells or fluid processing surface, made of any material including but not limited to plastic, composite, glass or silicon, by plasma technology for use in manipulating small volumes of fluids comprising the following steps:

placing such container, having a tube like structure or wells for containing such fluid or a surface to place drops of fluids into a position so as to be exposed appropriately to the plasma;

applying electromagnetic energy to the plasma generating device, thereby molecularly disassociating the gas, thus creating charged ions, free electrons, and free radicals, and charging the probe by the charged ions and free radicals attaching to the surfaces to be treated;

moving or leaving in place the containing device or surface for the dispensing of small volumes of fluid, or removing or leaving in place the containing device or surface without further processing.

7. The method in claim 6 using a gas mixture of oxygen and a carrier gas.

8. The method in claim 6 using with the carrier gas argon.

9. The method in claim 6 with the plasma charge being applied on a one or more coating materials or treatments on the containment device or surface.

* * * * *